US007649896B2

(12) United States Patent
Yang et al.

(10) Patent No.: US 7,649,896 B2
(45) Date of Patent: Jan. 19, 2010

(54) SYSTEM USING LABEL SWITCHING TECHNIQUES TO SUPPORT QOS FOR MOBILE AD-HOC NETWORKS AND ITS LABEL DISTRIBUTING AND SWITCHING METHOD

(75) Inventors: Jen-Shun Yang, Sinjhuang (TW); Pei-Hsuan Wu, Taipei (TW); Chien-Chao Tseng, Hsinchu (TW); Vincent Feng, Jhudong Township, Hsinchu County (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 1035 days.

(21) Appl. No.: 10/852,269

(22) Filed: May 25, 2004

(65) Prior Publication Data

US 2005/0111418 A1    May 26, 2005

(30) Foreign Application Priority Data

Nov. 24, 2003   (TW) .............................. 92132944 A

(51) Int. Cl.
*H04L 12/28* (2006.01)
(52) U.S. Cl. ...................... 370/399; 370/351; 370/389; 370/395.1; 370/396; 370/397; 370/398
(58) Field of Classification Search ................. 370/396, 370/397, 398, 399
See application file for complete search history.

(56) References Cited

U.S. PATENT DOCUMENTS 6,833,787 B1 * 12/2004 Levi ...................... 340/539.13

| 6,954,790 | B2 * | 10/2005 | Forslow ...................... 709/227 |
| 7,031,266 | B1 * | 4/2006 | Patel et al. .................. 370/254 |
| 2002/0057691 | A1 * | 5/2002 | Enoki et al. ................. 370/392 |
| 2003/0156541 | A1 * | 8/2003 | Haihong ..................... 370/235 |
| 2003/0210705 | A1 * | 11/2003 | Seddigh et al. ............. 370/419 |
| 2004/0196842 | A1 * | 10/2004 | Dobbins ..................... 370/389 |

OTHER PUBLICATIONS

Pei-Hsuan Wu; *Label Switching Techniques and QoS Supports for Mobile Ad-hoc Networks*; Jul. 2003, pp. i-56.
Chi-Hsiang Yeh; *DEAR: An Extension of Traffic Engineering for Routing and Resource Management in Ad Hoc Wireless Networks*; 2002; IEEE, pp. 1603-1607.

(Continued)

*Primary Examiner*—Vincent P Harper
*Assistant Examiner*—Mazda Sabouri
(74) *Attorney, Agent, or Firm*—Bacon & Thomas, PLLC

(57) ABSTRACT

The present invention provides a system using label switching techniques to support QoS for mobile ad-hoc networks and its label distributing and switching method. The system includes plural clusters, each having plural mobile nodes. At least one mobile node in a cluster is selected as a routing agent. One routing agent in a cluster is selected as a core routing agent. Each core routing agent is capable of obtaining an unique seed for generating an label $L=f(S, i, j)=S \times 3^i \times 2^j$ to a new LSP, where S is an unique seed that is an unique prime number, except 2 and 3, obtained by the core routing agent, i represents one of different kinds of LSP, and j represents one of different numbers for the same kind of LSP. Through the interconnecting of core routing agents, the virtual backbones can be constructed for bandwidth sharing.

16 Claims, 3 Drawing Sheets

OTHER PUBLICATIONS

Shih-Lin Wu et. al.; *Route Maintenance in a Wireless Mobile Ad Hoc Network*; IEEE; Proceedings of the 33$^{rd}$ Hawaii International Conference on System Sciences—2000; pp. 1-10.

Mario Gerla et. al.; *Multicluster, mobile, multimedia radio network*; 1995; Wirelss Networks 1, pp. 255-265.

M. Scott Corson et. al.; *A Distributed Routing Algorithm for Mobile Wireless Networks*; 1995; Journal of ACM/Baltzer Wireless Networks, vol. 1, No. 1, pp. 61-81.

Chi-Hsiang Yeh; *Ad-hoc MPLS for Virtual-connection-oriented Mobile Ad Hoc Networks*; 2002; IEEE; pp. 1101-1105.

Sergiy Butenko et. al.; *On the construction of virtual backbone for ad hoc wireless network*; pp. 1-12.

Sandeep K. S. Gupta et. al.; *An Adaptive Protocol for Reliable Multicast in Mobile Multi-hop Radio Networks*; Department of Computer Science, Colorado State University, Ft. Collins, CO.; pp. 1-12.

Prasun Sinha et. al.; *CEDAR: a Core-Extraction Distributed Ad hoc Routing algorithm*; University of Illinois at Urbana-Champaign; pp. 1-8.

David B. Johnson et. al.; *Dynamic Source Routing in Ad Hoc Wireless Networks*; Computer Science Department, Carnegie Mellon University, Pittsburgh, PA; pp. 1-18.

Josh Broch et. al.; *A Performance Comparison of Multi-Hop Wireless Ad Hoc Network Routing Protocols*; Computer Science Department, Carnegie Mellon University, Pittsburgh, PA; pp. 1-13.

Young-Bae Ko et. al.; *Location-Aided Routing (LAR) in Mobile Ad Hoc Networks*; Department of Computer Science, Texas A&M University, College Station, TX; pp. 1-10.

J. J. Garcia-Luna-Aceves et. al.; *The Core-Assisted Mesh Protocol*; Computer Engineering Department, Baskin School of Engineering, University of California, Santa Cruz, CA; pp. 1-13.

Elizabeth M. Royer et. al.; *Multicast Operation of the Ad-hoc On-demand Distance Vector Routing Protocol*; Department of Electrical and Computer Engineering, University of California, Santa Barbara, Santa Barbara, CA; pp. 1-6.

Sze-Yao Ni et. al.; *The Broadcast Storm Problem in a Mobile Ad Hoc Network*; Department of Computer Science and Information Engineering, National Central University, Chung-Li, Taiwan, pp. 1-12.

Shigang Chen et. al.; *Distributed Quality-of-Service Routing in Ad Hoc Networks*; IEEE Journal on Selected Areas in Communications, vol. 17, No. 8; Aug. 1999; pp. 1488-1505.

Elizabeth M. Royer et. al.; A Review of Current Routing Protocols for Ad Hoc Mobile Wireless Networks; Apr. 1999; IEEE Personal Communications; pp. 46-55.

S. Blake et. al.; *An Architecture for Differentiated Services*; Dec. 1998, pp. 1-36.

E. Rosen et. al.; *Multiprotocol Label Switching Architecture*; Jan. 2001, pp. 1-61.

E. Rosen et. al.; *MPLS Label Stack Encoding*; Jan. 2001, pp. 1-23.

Xukai Zou et. al.; *Routing Techniques in Wireless Ad Hoc Networks—Classification and Comparison*; pp. 1-6.

Ulas C. Kozat et. al.; *Virtual Dynamic Backbone for Mobile Ad Hoc Networks*; pp. 1-7.

Young-Bae Ko et. al.; *Location-Aided Routing* (LAR) in mobile ad hoc networks; 2000, pp. 307-321.

Young-Bae Ko et. al.; *Geocasting in Mobile Ad Hoc Networks: Location-Based Multicast Algorithms*; Department of Computer Science, Texas A&M University, College Station, TX;, pp. 1-10.

D. Awduche et. al.; *RSVP-TE: Extensions to RSVP for LSP Tunnels*; Dec. 2001, pp. 1-46.

F. Le Faucheur et. al.; *Multi-Protocol Label Switching (MPLS) Support of Differentiated Services*; May 2002, pp. 1-48.

L. Anderson et. al.; *LDP Specification*; Jan. 2001, pp. 1-103.

\* cited by examiner

SYSTEM USING LABEL SWITCHING TECHNIQUES TO SUPPORT QOS FOR MOBILE AD-HOC NETWORKS AND ITS LABEL DISTRIBUTING AND SWITCHING METHOD

BACKGROUND OF THE INVENTION

1. Field of the Invention

The present invention relates to the technical field of mobile ad-hoc networks and, more particularly to a system using label switching techniques to support QoS in mobile ad-hoc networks and its label distributing and switching method.

2. Description of Related Art

Wireless network architecture can be divided into wireless infrastructure networks and mobile ad-hoc networks (MANETs). In the infrastructure network, access points (APs) are implemented in the terminals of wire-line backbones, and a mobile node (MN) can use the APs to link the wire-line backbones for information communication. However, it is disadvantage that the wireless communication can occur only between an AP and an MN but AP deployment is not widespread. By contrast, the mobile ad-hoc network does not use the wire-line backbones, and corresponding NMs use wireless network interface to communication with one another without AP support. Since the range of wireless signaling is limited for a wireless network interface, the communication between NMs may also require other MN as a relay to forward the messages. Although the wireless infrastructure network is the most widely acceptable mode to construct wireless access network until recently, research reports have predicted that mobile ad-hoc networks will be adopted widely in future networks. Further, multimedia transmissions are demanded increasingly and accordingly the requirements of Quality of Service (QoS) control are going to appear in mobile ad-hoc networks, so that the end-to-end QoS guarantee over a mobile ad-hoc network and the Internet must be provided. However, it is not easy to maintain the fixed routing of a mobile ad-hoc network, due to the network topology is changing while the MNs are moving. Also, it is not easy to offer the QoS guarantee in an unstable routing path. Therefore, the MN responsible of forwarding in the mobile ad-hoc network is expected as a low-speed mover or a half-fixed node moving rarely.

In the future, QoS supporting for the streaming multimedia services can be obtained by the QoS architecture of Differentiated Services (DiffServ). To achieve QoS of DiffServ, most researches have applied Multi-Protocol Label Switch (MPLS), which adds label switching in data link layer to support QoS-related bandwidth reservation and management by data connection-oriented setup.

MPLS provided by IETF (Internet Engineering Task Force) is a new generation of IP switching, which combines label swapping and IP routing to effectively increase the performance of IP routing, extensibility of network layer and convenience of new routing services, and provide the support of QoS control services. As shown in FIG. 1, a complete MPLS network is constructed of plural Differentiated Service (DS) domains. Each DS domain is constructed of plural Label Switching Routers (LSRs) and Label Edge Routers (LERs). An LSR performs label switching for packet with labels. An LER can be an ingress or egress node at the entrance or exit of each DS domain of the MPLS network. When an explicit LSP is going to be constructed among LSRs, the MPLS network could apply Label Distribution Protocol (LDP) to distribute routing and label mapping to a respective LSR along the routing path determined by IP routing algorithm. After a Label Switch Path (LSP) is constructed in the DS domain, a respective LER is responsible to the conversion between IP and label. If the respective LER is an ingress node, it is also responsible to data packet classification and monitoring, connection admission control and interaction to the neighboring DS domains. If the respective LER is an egress node, it is also responsible to the remove the label for the data packets that will be forwarded to an IP network.

The advantages of MPLS protocol are that fast and simple label switching between adjacent routers instead of slow and complicated IP routing globally, and it is able to easily support various QoS. Currently, many significant methods can support QoS control mechanism of DiffServ on wire-line backbones. However, since the mobile ad-hoc networks belong to the broadcast networks, several NMs may share a single radio channel and thus the LSP cannot be distinguished by physical line. As such, MPLS protocol in a mobile ad-hoc network needs MAC address to map labels for routing and thus causes original label distribution and switching inappropriately used in wire-line networks. Unfortunately, there are still no any significantly label allocation and QoS control mechanism been proposed in the mobile ad-hoc network until recently. Therefore, it is desirable to provide an improved system and switching method to mitigate and/or obviate the aforementioned problems.

SUMMARY OF THE INVENTION

An object of the invention is to provide a system using label switching techniques to support QoS in mobile ad-hoc networks and its label distributing and switching method, which can apply MPLS to mobile ad-hoc networks.

Another object of the invention is to provide a system using label switching techniques to support QoS in mobile ad-hoc networks and its label distributing and switching method, which can construct an MPLS tunnel on a predetermined virtual backbone in a mobile ad-hoc network, thereby increasing transmission performance of the mobile ad-hoc network, sharing bandwidth and providing control of connection QoS through the tunnel, as well as solve the problem of connection fault tolerance.

According to a feature of the invention, a system using label switching techniques to support QoS in mobile ad-hoc networks is provided. The system includes plural clusters, each having plural mobile nodes (MNs). For each cluster, one or more mobile nodes are selected as routing agents and one of the routing agents is selected as a core routing agent. Each core routing agent can obtain a unique seed to further generate a label from label generating function, $L=f(S, i, j)=S \times 3^i \times 2^j$, for a new Label Switch Path (LSP), where S is a unique seed that is a prime number, except 2 and 3, obtained by the core routing agent, i represents a different-type LSP, and j represents a same-type, different-number LSP. Namely, an LSP can be assigned a unique label for routing by applying the label generating function with the unique seed as input parameter.

According to another feature of the invention, a label distributing and switching method for mobile ad-hoc networks is provided. The method includes a seed generating step and a label generating step. In the seed generating step, each core routing agent obtains a unique seed. In the label generating step, each core routing agent generates a respective label $L=f(S, i, j)=S \times 3^i \times 2^j$ for a new Label Switch Path (LSP), where S is a unique seed that is a prime number, except 2 and 3, obtained by the core routing agent, i represents a different-type LSP, and j represents a same-type, different-number LSP.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
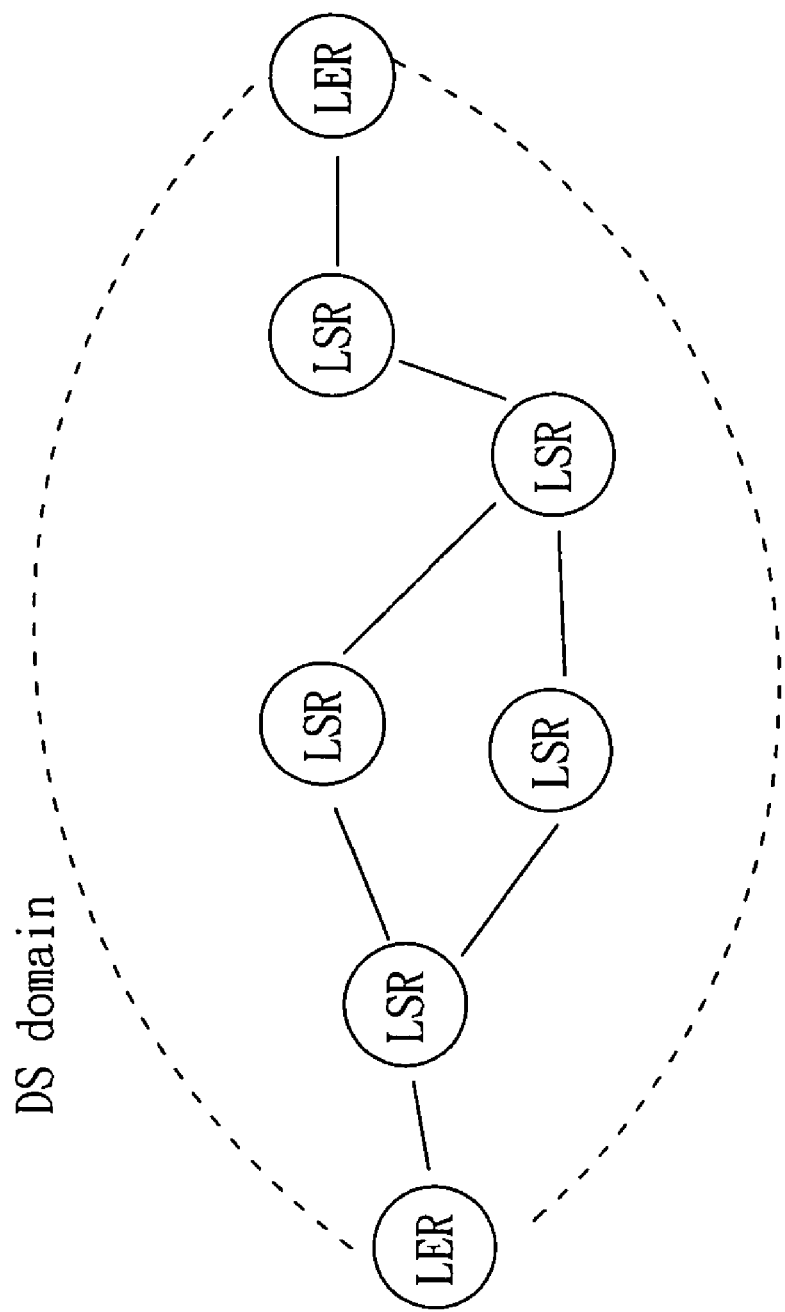
FIG. 1 is a chart of a Differentiated Service (DS) domain of a typical MPLS network.
Figure 2:
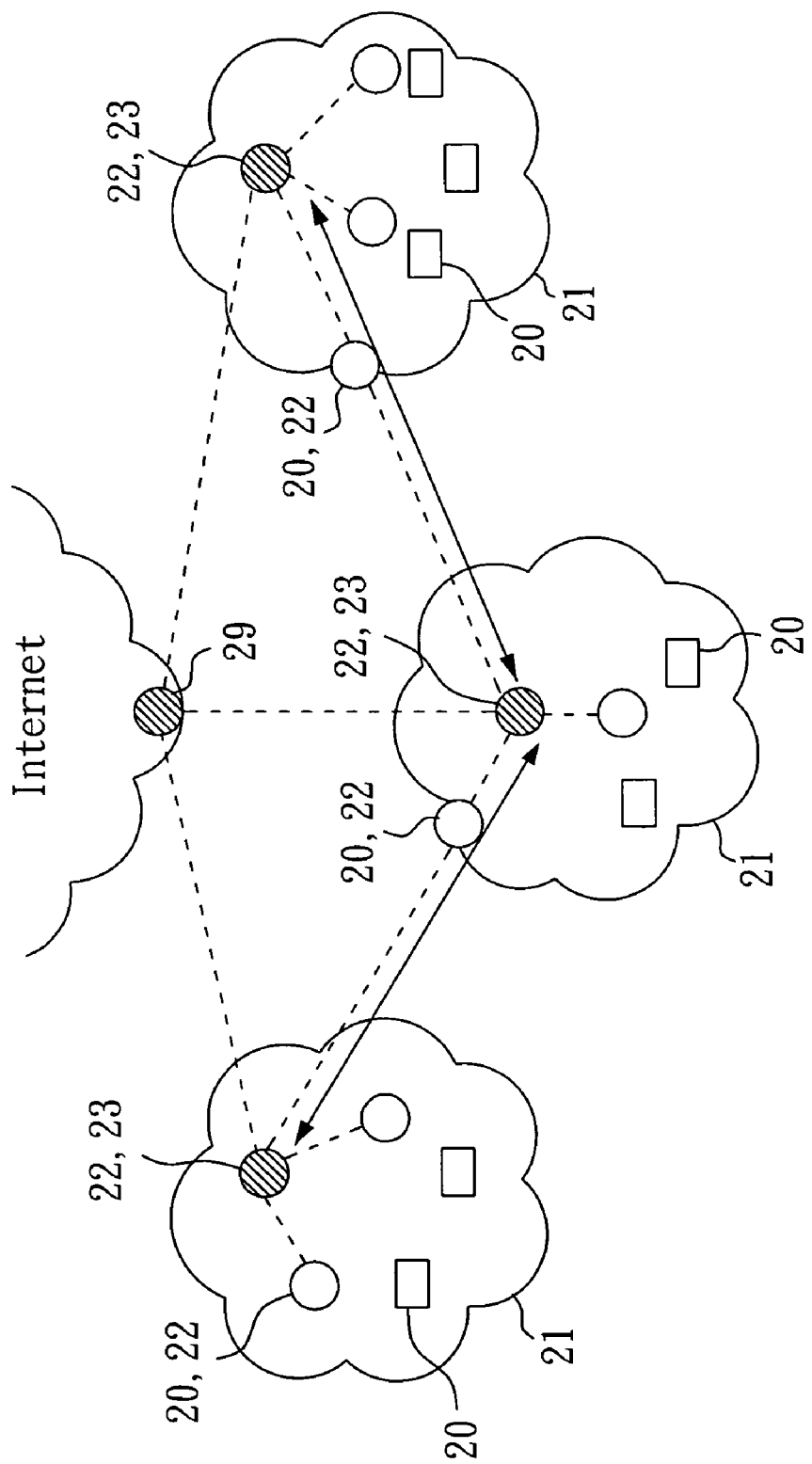
FIG. 2 is a configuration diagram of a system using label switching techniques to support QoS in mobile ad-hoc networks according to the invention.

FIG. 2 is a configuration diagram of a system using label switching techniques to support QoS in mobile ad-hoc networks according to the invention. As shown in FIG. 2, all mobile nodes (MNs) of mobile ad-hoc networks (MANETs) configure a number of clusters 21. A node 20 in each cluster 21 includes one or more routing agents. One of the routing agents in each cluster is selected by a static or dynamic way as the core routing agent 23. In this preferred embodiment, the static way is employed to assign a slower or half-fixed routing agent 22 as the core routing agent 23.

In a hierarchical MANET, connection between a core routing agent 23 and an adjacent core routing agent can be regarded as a backbone connection of the MANET. In addition, in a cluster 21, connection between a routing agent 22 and a core routing agent 23 can be regarded as an access network of the MANET. All routing agents 22 in a cluster 21 can feed data into the backbone connection through the core routing agent 23 for forwarding the data to a different cluster 21.

In the hierarchical MANET, an LSP is constructed by distributing routing and label mapping. This embodiment uses the core routing agent 23 as a low-level label manager (LL-Manager) and a router 29 of the Internet as a high-level label manger (HL-Manager). Each core routing agent 23 obtains a unique seed from the high-level router 29 first and then generates a label by the following label generating function:

$$\text{Label} = f(\text{seed}, i, j) = \text{seed} \times 3^i \times 2^j,$$

wherein seed represents a unique prime number, except 2 and 3, as the unique seed obtained by the agent 23; i represents different type of LSP, where i=0 represents On-demand data LSP (ODD-LSP), i=1 represents Pre-constructed core to agent signal LSP (S-LSP), i=2 represents Pre-constructed core to core S-LSP for neighboring cores, i=3 represents Pre-constructed core to core S-LSP for non-neighboring, and i=4 represents Pre-constructed backbone data LSP (BD-LSP); and j represents different number of the same type of LSP. After parameters seed, i=2 and j=0 are applied to the label generating function for computation, a label is generated as $5*3^2*2^0=45$.

The output of the label generating function is different as any of the parameters seed, i and j is different. Since the high-level router 29 distributes a unique seed to each core routing agent 23, different core routing agents 23 can generate different label space, so that labels that are generated by the prime number-based label generating function can be guaranteed no repeat. Also, the LSPs generated by different core routing agents 23 can be distinct by seed and i for providing different QoS.

Pre-constructed LSP (P-LSP) in MANET can be obtained by the cited label distribution mechanism. Upon the purpose, the P-LSP can, be divided into signal LSP (S-LSP) and backbone data LSP (BD-LSP). The S-LSP is pre-constructed between a core routing agent 23 and a routing agent 22 and between a core routing agent 23 and a core routing agent 23. As such, when a mobile node 20 sends a packet with on-demand connection request to a respective routing agent 22, the routing agent 22 can quickly forward the packet to a respective core routing agent 23 through the S-LSP between the routing agent 22 and the core routing agent 23. When the core routing agent 23 receives the packet with on-demand connection request, the core routing agent 23 can use an S-LSP between the core routing agent 23 and a neighbor core routing agent 23 to thus send a destination search request to the neighbor core routing agent 23 quickly and further construct an on-demand data LSP (ODD-LSP) for subsequent data packet forwarding. BD-LSP is pre-constructed between core routing agents 23, so that all data packets forwarded between the core routing agents 23 use the BD-LSP for tunneling.

Figure 3:
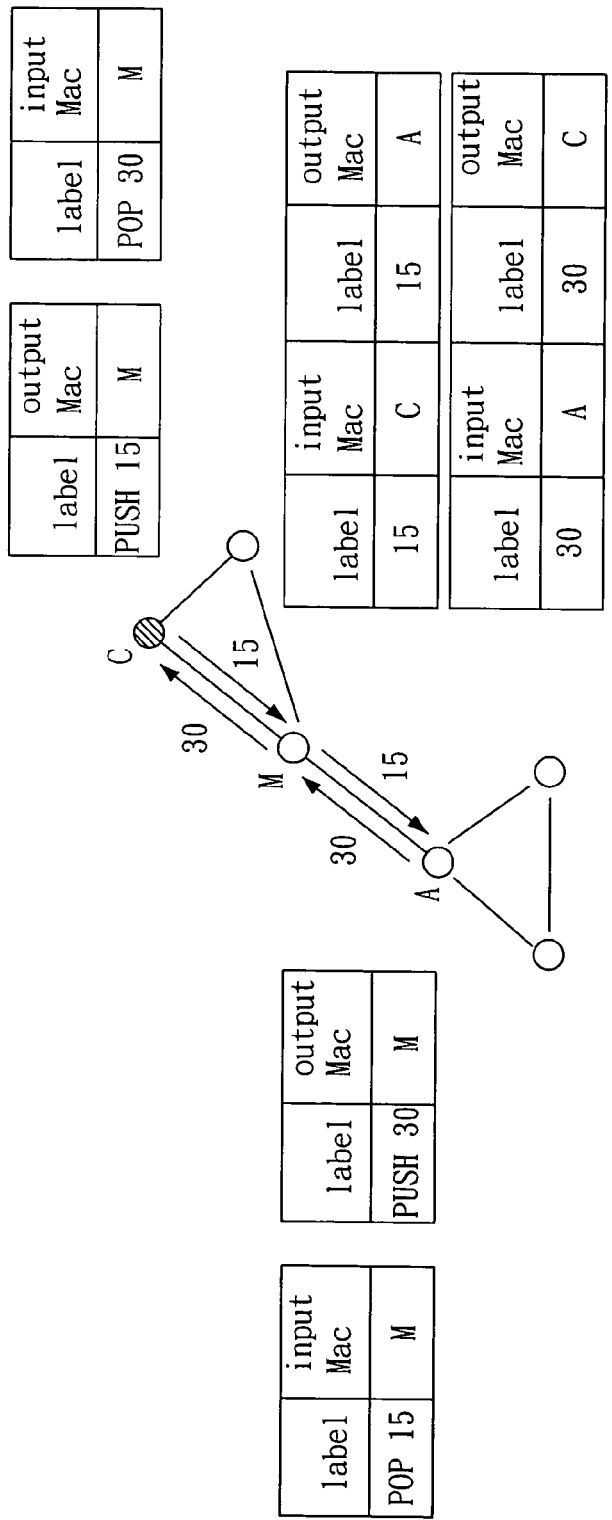
FIG. 3 is a schematic chart of constructing an S-LSP between a core routing agent and a routing agent according to the invention.

FIG. 3 is a schematic chart of constructing an S-LSP between a core routing agent C and a routing agent A according to the invention. As shown in FIG. 3, for a forward S-LSP from the agent C to the agent A, the agent C first obtains a seed S=5 and then generates a label $L=S\times 3^i \times 2^j = 5\times 3^1 \times 2^0 = 15$ by the label generating function. The label L=15 is distributed into a path from the agent C to the agent A (in this case, C→M→A). For a backward S-LSP from the agent A to the agent C, due to the forward S-LSP (j=0), values j for the backward S-LSP and the forward S-LSP are different. It is assumed that j=1 for the backward S-LSP. At this point, the label generating function can determine a label $L=S\times 3^i \times 2^j = 5\times 3^1 \times 2^1 = 30$ for distributing it into a backward path from the agent A to the agent C (A→M→C). As the cited label distribution, the S-LSP between the agents C and A can be constructed on the MPLS requirement. Namely, a lookup table that indicates the relation of MAC addresses and labels is set up between every two of the core routing agent C, a middle node M and the routing agent A.

Figure 4:
FIG. 4 is a schematic chart of constructing an S-LSP between a core routing agent and a neighbor core routing agent according to the invention.
Figure 4:
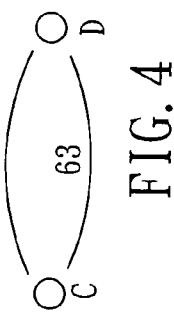

FIG. 4 is a schematic chart of constructing an S-LSP between a core routing agent C and a neighboring core routing agent D according to the invention. As shown in FIG. 4, for an S-LSP from the agent C to the agent D, the agent C first obtains a seed S=5 and then generates a label $L=S\times 3^i \times 2^j = 5\times 3^2 \times 2^0 = 45$ by the label generating function. For an S-LSP from the agent D to the agent C, the agent D obtains a seed S=7 and then generates a label $L=S\times 3^i \times 2^j = 7\times 3^2 \times 2^0 = 63$ by the label generating function. As the cited label distribution, the S-LSP between the agents C and D can be constructed on the MPLS requirement. Namely, a lookup table that indicates the relation of MAC addresses and labels is set up between the agents C and D.

An S-LSP between the core routing agent 23 and the non-neighboring core routing agent 23 can be constructed the same as that between the agents C and D, except for i=3. A BD-LSP between the agents 23 can also be constructed the same as the S-LSP between the agents C and D, except for i=4.

When the mobile node 20 sends an on-demand connection request to set up an ODD-LSP, due to the constructed S-LSP between the agents 23 and between the agent 23 and the agent 22 as aforementioned, the connection request can be sent from a source core routing agent to a destination core routing agent through the S-LSPs and further forward and backward LSPs can be constructed concurrently. For the forward LSP construction, the source core routing agent obtains a seed S1 to accordingly generate a label $L=S1\times3^0\times2^x$ by the label generating function. For the backward LSP construction, the destination core routing agent obtains a seed S2 to accordingly generate a label $L=S2\times3^0\times2^{x+1}$ by the label generating function.

In this invention, pre-constructed BD-LSP can reserve appropriate bandwidth for being shared by all ODD-LSPs passing therethrough, thereby further ensuring the guarantee of QoS.

In addition, due to low reliability in MANET, in order to overcome the problems of searching the QoS routing with appropriate bandwidth and detecting the BD-LSP breakdown, multiple different-path duplicated BD-LSP tunnels can be constructed between two core routing agents and retention mode defined by the MPLS protocol can record all possible paths. Accordingly, a shortest-path BD-LSP tunnel can initially be used and all duplicated BD-LSP tunnels are recorded. Thus, if the MANET network topology is unstable, the shortest-path BD-LSP may be disconnected. At this point, one of the duplicated BD-LSP can be selected to quickly replace the shortest-path BD-LSP, thereby overcoming fault tolerance problem and resulting in fast re-construction for the disconnection. However, if no more duplicated BD-LSP can be used, re-construction of required P-LSPs is a must.

In view of the foregoing, it is known that the invention provides a hierarchical routing architecture to support QoS control in a mobile ad-hoc network. The cited core routing agents in a cluster are interconnected to those in its neighboring cluster, thereby forming a virtual backbone. Next, LSP tunnels are constructed upon the label stack principle in MPLS so that end-to-end single level LSP message transfer in the mobile ad-hoc network is changed into a communication form of double level LSP tunnel transmission (FIG. 2). Namely, first level is a transmitting cluster routing agent to a core routing agent (Agent to Core) and a receiving core routing agent to a cluster routing agent (Core to Agent), and second level is an LSP tunnel for core to core routing agents (Core to Core). Therefore, the invention can achieve the purposes of sharing virtual backbone network bandwidth, reducing signal packet number, reducing routing delay as forwarding data packet, and quickly re-constructing path as disconnecting unexpectedly.

Although the present invention has been explained in relation to its preferred embodiment, it is to be understood that many other possible modifications and variations can be made without departing from the spirit and scope of the invention as hereinafter claimed.

What is claimed is:

1. A system using label switching techniques to support QoS in mobile ad-hoc networks, comprising plural clusters, each cluster having plural mobile nodes, at least one of the mobile nodes in a cluster being selected as a routing agent, one of the routing agents in a cluster being selected as a core routing agent, wherein each core routing agent obtains an unique seed, which is a prime number to generate a label (L) for Label Switch Path (LSP) by applying an equation:

$$L=f(S, i, j)=S\times m^i \times n^j,$$

where m and n are two different pre-assigned prime numbers, S is the unique seed, which is a prime number except m and n, obtained by the core routing agent, i represents a different type of LSP, and j represents a different number of the same type of LSP.

2. The system as claimed in claim 1, wherein a Signal LSP (S-LSP) between a core routing agent and a respective routing agent is pre-constructed by a label $L=S\times3^i\times2^j$ generated by the core routing agent.

3. The system as claimed in claim 1, wherein an S-LSP between two neighboring core routing agents is pre-constructed by labels $L=f(S, i, j)=S\times3^2\times2^j$ generated by the two core routing agents respectively.

4. The system as claimed in claim 1, wherein an S-LSP between a core routing agent and non-neighboring core routing agent is pre-constructed by labels $L=f(S, i, j)=S\times3^3\times2^j$ generated by the two core routing agents respectively.

5. The system as claimed in claim 1, wherein a Backbone Data LSP (BD-LSP) between two core routing agents is pre-constructed by labels $L=S\times3^4\times2^j$ generated by the two core routing agents respectively.

6. The system as claimed in claim 1, wherein when a mobile node sends an on-demand connection request for constructing On-Demand Data LSPs (ODD-LSPs), the connection request is forwarded from a source core routing agent to a destination through the S-LSPs, so that forward and backward LSPs are constructed respectively by a label $L=S\times3^0\times2^x$ generated by the source core routing agent and a label $L=S\times 3^0\times2^{x+1}$ generated by the destination core routing agent.

7. The system as claimed in claim 5, wherein the BD-LSP pre-constructed reserves predetermined bandwidth for being shared by all ODD-LSPs passing therethrough.

8. The system as claimed in claim 7, wherein multiple different-path duplicated BD-LSP tunnels are constructed between two core routing agents.

9. The system as claimed in claim 1, wherein the core routing agent selected from the routing agents in each cluster is a slower or half-fixed station.

10. The system as claimed in claim 1, wherein each core routing agent obtains the unique seed from a router of the Internet.

11. A label distributing and switching method for a mobile ad-hoc network, the mobile ad-hoc network including plural clusters, each cluster having plural mobile nodes, at least one of the mobile nodes in a cluster being selected as a routing agent, one of the routing agents in a cluster being selected as a core routing agent, the method comprising the steps:

a seed generating step in which each core routing agent obtains a unique seed (S) which is a prime number;

a label generating step in which each core routing agent generates a label (L) for Label Switch Path (LSP) based on the seed according to a following equation:

$$L=f(S, i, j)=S\times m^i \times n^j,$$

where m and n are two different pre-assigned prime numbers, S is a prime number except m and n, i represents a different type of LSP and j represents a different number of the same type of LSP.

12. The method as claimed in claim 11, wherein an S-LSP between a core routing agent and a respective routing agent is indicated as i=1.

13. The method as claimed in claim 11, wherein an S-LSP between two neighboring core routing agents is indicated as i=2.

14. The method as claimed in claim 11, wherein an S-LSP between a core routing agent and non-neighbor core routing agent is indicated as i=3.

15. The method as claimed in claim 11, wherein a BD-LSP between two core routing agents is indicated as i=4.

16. The method as claimed in claim 11, wherein an ODD-LSP between source and destination core routing agents for a on-demand connection request is indicated as i=0.

* * * * *

UNITED STATES PATENT AND TRADEMARK OFFICE
CERTIFICATE OF CORRECTION

PATENT NO. : 7,649,896 B2  Page 1 of 1
APPLICATION NO. : 10/852269
DATED : January 19, 2010
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

Signed and Sealed this

Twenty-eighth Day of December, 2010

David J. Kappos
*Director of the United States Patent and Trademark Office*